US008326688B2

(12) United States Patent
Harrison et al.

(10) Patent No.: US 8,326,688 B2
(45) Date of Patent: Dec. 4, 2012

(54) METHOD AND SYSTEM FOR BEHAVIORAL CLASSIFICATION

(75) Inventors: Paul Harrison, Keller, TX (US); James Oliphant, Pleasant Grove, UT (US); Hal Fulton, Austin, TX (US); Armin Roehrl, Koetzig (DE); Brenden Grace, Charlottesville, VA (US)

(73) Assignee: Collective, Inc., New York, NY (US)

( * ) Notice: Subject to any disclaimer, the term of this patent is extended or adjusted under 35 U.S.C. 154(b) by 90 days.

(21) Appl. No.: 12/694,536

(22) Filed: Jan. 27, 2010

(65) Prior Publication Data
US 2010/0228629 A1 Sep. 9, 2010

Related U.S. Application Data

(60) Provisional application No. 61/206,416, filed on Jan. 29, 2009.

(51) Int. Cl.
*G06Q 30/00* (2012.01)
(52) U.S. Cl. .................. 705/14.53; 705/14.66
(58) Field of Classification Search .............. 705/14.53, 705/14.66
See application file for complete search history.

(56) References Cited

U.S. PATENT DOCUMENTS

| | | | |
|---|---|---|---|
| 5,251,131 A | 10/1993 | Masand et al. | |
| 5,727,199 A | 3/1998 | Chen et al. | |
| 6,026,399 A | 2/2000 | Kohavi et al. | |
| 6,044,375 A | 3/2000 | Shmueli et al. | |
| 6,134,532 A * | 10/2000 | Lazarus et al. | 705/14.25 |
| 6,523,026 B1 | 2/2003 | Gillis | |
| 6,763,496 B1 * | 7/2004 | Hennings et al. | 715/205 |
| 7,194,471 B1 | 3/2007 | Nagatsuka et al. | |
| 7,716,216 B1 | 5/2010 | Harik et al. | |
| 2003/0023488 A1 | 1/2003 | Landsman et al. | |
| 2003/0182304 A1 | 9/2003 | Summerlin et al. | |
| 2004/0034633 A1 | 2/2004 | Rickard | |
| 2004/0088157 A1 | 5/2004 | Lach et al. | |
| 2004/0215509 A1 | 10/2004 | Perry | |
| 2004/0215515 A1 | 10/2004 | Perry | |
| 2004/0254911 A1 | 12/2004 | Grasso et al. | |
| 2005/0154781 A1 | 7/2005 | Carlson et al. | |
| 2006/0080293 A1 | 4/2006 | Nahum | |
| 2007/0022085 A1 | 1/2007 | Kulkarni | |
| 2007/0073678 A1 | 3/2007 | Scott et al. | |
| 2007/0143296 A1 * | 6/2007 | Casion | 707/10 |
| 2007/0300152 A1 | 12/2007 | Baugher | |

(Continued)

OTHER PUBLICATIONS

International Search Report and Written Opinion for PCT/US2010/22176 dated Mar. 12, 2010.

(Continued)

*Primary Examiner* — Donald L. Champagne
(74) *Attorney, Agent, or Firm* — Morgan Lewis & Bockius LLP

(57) ABSTRACT

A plurality of pages viewed by a communications network user (e.g., an Internet user) are classified as pertaining to one of a plurality of topics. A count of each of the pages viewed by the communications network user for each of the topics is tracked, as is a recency with which each of the pages viewed by the communications network user was viewed for each of the topics. The communications network user is characterized as belonging to one or more behavioral segments based on the count and the recency. Advertisements are served to the communications network user based on at least advertising targeting parameters and the characterization.

3 Claims, 2 Drawing Sheets

U.S. PATENT DOCUMENTS

| | | | |
|---|---|---|---|
| 2008/0059486 | A1 | 3/2008 | Pappas |
| 2008/0104032 | A1 | 5/2008 | Sarkar |
| 2008/0275753 | A1* | 11/2008 | Protheroe et al. ............... 705/8 |
| 2008/0275777 | A1* | 11/2008 | Protheroe et al. ............... 705/14 |
| 2009/0006363 | A1 | 1/2009 | Canny et al. |
| 2009/0089277 | A1 | 4/2009 | Cheslow |

OTHER PUBLICATIONS

PCT International Preliminary Report on Patentability, PCT/US2010/022176, dated Aug. 11, 2011 (2 pages) attaching PCT Written Opinion of the International Searching Authority, dated Mar. 12, 2010 (3 pages).

PCT International Preliminary Report on Patenability, PCT/US2009/063994, dated May 26, 2011 (2 pages) attaching PCT Written Opinion of the International Searching Authority, dated Jan. 12, 2009 (4 pages).

Thomas, Paul, Generalising Multiple Capture-Recapture to Non-Uniform Sample Sizes, Jul. 20-24, 2008 SIGIR'08, (2 pages).

PCT International Preiminary Report on Patentability, PCT/US2010/041353, dated Jan. 19, 2012 (5 pages) attaching PCT International Search Report and Written Opinion of the International Searching Authority dated Sep. 1, 2010 (7 pages).

Chavez-Demoulin, V.C., et al.; The WEB archives: A time-machine in your pocket!; Feb. 14, 2000, www.approximity.com/papers/archive13 (16 pages).

Cilibrasi, Rudi L., et al.; The Google Similarity Distance; IEEE Transactions on Knowledge and Data Engineering, Mar. 2007, vol. 19, No. 3, pp. 370-383 (15 pages).

Domingos, Pedro, et al.; On the Optimality of the Simple Bayesian Classifier under Zero-One Loss; Machine Learning, vol. 29, pp. 103-130 (1997) (28 pages).

Gupta, Aarti, et al.; Using Ontologies and the Web to Learn Lexical Semantics, IJ CAI, 2007, pp. 1618-1623 (6 pages).

Kotisiantis, S.B., et al.; Logitboost of Simple Bayesian Classifier; Informatica, 2005 vol. 29, pp. 53-59, (7 pages).

Zhang, Harry; The Optimality of Naive Bayes; 2004, American Association for Artificial Intelligence (www.aaai.org) (6 Pages).

Wong, Wilson, et al.; Tree-Traversing Ant Algorithm for term clustering based on featureless similarities; (2007) Data Min. Knowl. Disc., vol. 15, pp. 349-381 (33 pages).

Rish, I; An empirical study of the naive Bayes classifier, IJCAI 2001 Workshop of Empircal Methods in Artificial Intelligence (6 pages).

Minsky, Marvin; Steps Toward Artificial Intelligence; Dept. of Mathematics, MIT, Research Lab. of Electronics, MIT (72 pages).

McCallum, Andrew, et al.; A Comparison of Event Models for Naive Bayes Test Classification, AAAI/ICML-98 Workshop on Learning for Text Classification; AAAI Press—1998—vols. Technical Report WS-98-05, pp. 41-48 (8 pages).

PCT International Search Report and the Written Opinion of the International Searching Authority PCT/US09/04580, dated Sep. 24, 2009 (4 pages).

* cited by examiner

METHOD AND SYSTEM FOR BEHAVIORAL CLASSIFICATION

CROSS REFERENCE TO RELATED APPLICATIONS

This application claims the benefit of the U.S. Provisional Patent Application No. 61/206,416 filed on Jan. 29, 2009, which is hereby incorporated by reference in its entirety.

FIELD OF THE INVENTION

The present invention relates to methodologies for characterizing the behavior of Internet users.

BACKGROUND

Characterizing the behavior of users of the Internet is difficult to accomplish. Known methods involve combining information about the user that is self-reported along with purchase behavior, click behavior, and general information about the domain of the websites visited by the user. While this information can provide insights, it is limited.

SUMMARY OF THE INVENTION

The present invention is directed to a system, method and computer readable storage medium for characterizing behavior of users of a communications network, such as the Internet. A plurality of pages viewed by a communications network user are classified as pertaining to one of a plurality of topics. A count of each of the pages viewed by the communications network user for each of the topics is tracked, as is a recency with which each of the pages viewed by the communications network user was viewed for each of the topics. The communications network user is characterized as belonging to one or more behavioral segments based on the count and the recency. Advertisements are served to the communications network user based on at least advertising targeting parameters and the characterization.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Figure 1:
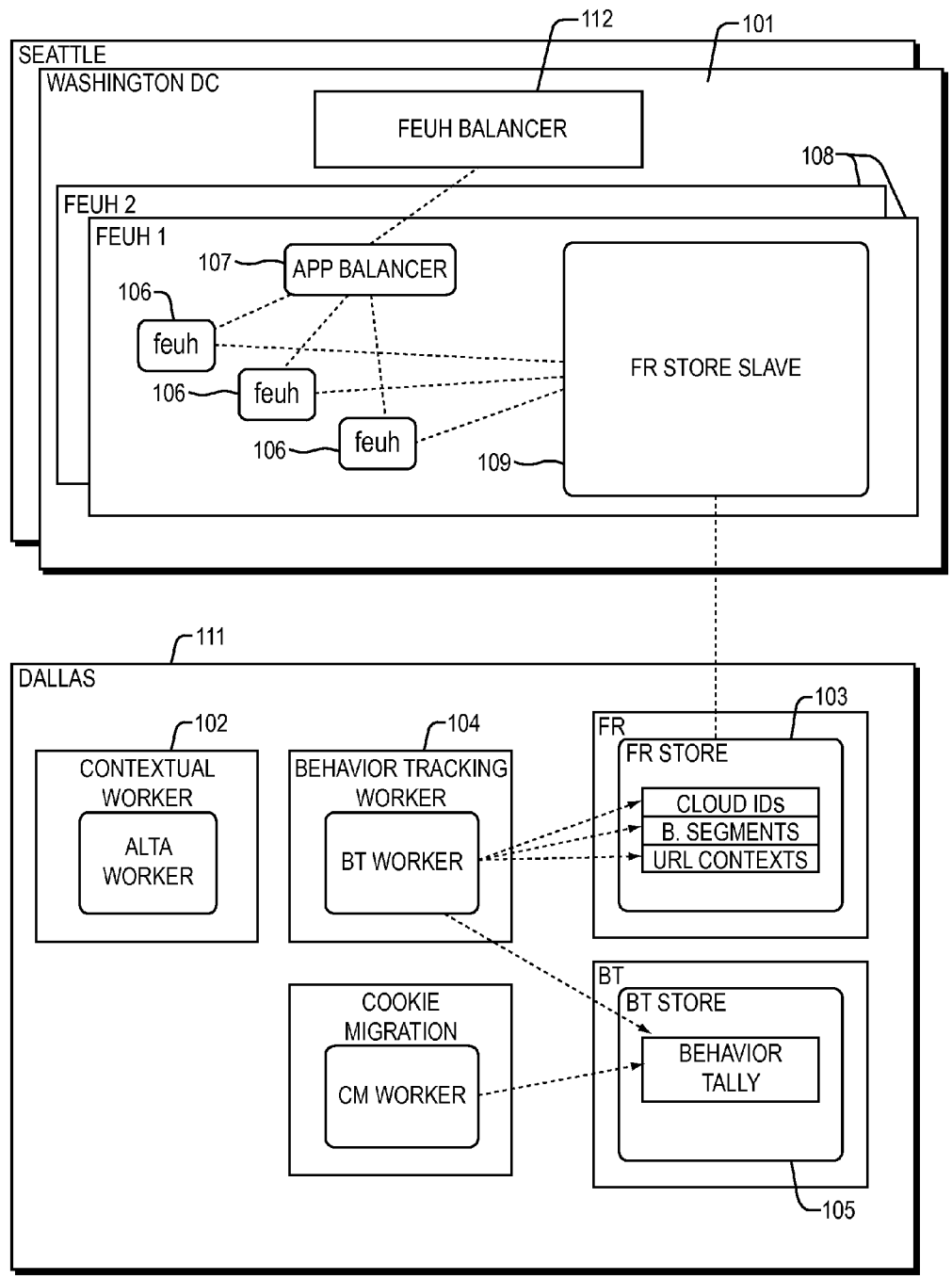
FIG. 1 is diagram illustrating system components and how such components interact in accordance with the present invention.

Reference will now be made in detail to the embodiments of the present invention, examples of which are illustrated in the accompanying drawings. Wherever possible, like reference numbers will be used for like elements.

The methods and systems described herein characterize Internet users based on the context of the pages they visit. This is accomplished through the use of contextual information derived from a classification engine and an application of parameters in defining that characterization. In one embodiment, the solution uses a real-time classification engine, classifying individual pages visited by a user.

Behavioral characterization of a user is based on the concept of determining the actions of that user over time. In connection with the present invention, that concept is adapted to utilize a classification system to determine what, contextually, a person is looking at on the Internet, over time, in order to characterize the person. Once the person is characterized, that information can be used in many ways, including determining what types of Internet advertisements should be served to that person.

The characterizations are dictated through a set of parameters. These parameters include, in one embodiment, (1) the probability percentage that a page is about a certain topic (i.e., classification), (2) the frequency with which that classification is seen, and (3) the recency with which it has occurred.

For example, in order to characterize a user as one who was interested in sports, the parameters setup would be to identify users that visit pages that are X % or more about Sports, Y or more times, within Z period of time. By way of specific example, a user that visits pages 50% or more likely to be about Sports, 10 or more times, within the last week would be an exemplary behavioral characterization using a baseline classification system. In order to classify pages, different methodologies can be used. One such method of classifying Internet pages is described in co-pending U.S. patent application Ser. Nos. 12/462,908 and 12/616,505, owned by the assignee of the present application, which are hereby incorporated by reference in their entirety.

As mentioned above, once a user is behaviorally characterized, that information can be used in a variety of different ways, including targeting advertisements to such user based on their behavior as characterized. The following describes an exemplary system (referring to FIG. 1) used in conjunction with a classification engine to characterize and behaviorally target advertisements to Internet users.

In one embodiment, a computer system for implementing the present invention includes one or more processors and computer readable storage (e.g., memory devices or other computer readable storage media) storing programs (e.g., computer-executable instructions) for execution by the one or more processors. Computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system.

Such a system may include the following components, with reference to FIG. 1, in one embodiment: a classification engine 102; a software program, within classification engine 102, that tallies each classification per user; a behavioral tracking engine 104 that takes those tallies and derives behavioral characterizations referred to herein as behavioral segments, which are stored in storage medium 103; a storage medium 105 to persist the behavioral segments; and a retrieval mechanism for utilizing those descriptions in connection with serving advertisements to users over the Internet.

Referring still to FIG. 1, Front End URL Handler (FEUH) 101 is the entry point for ad calls. It translates the URL passed from a publisher into Javascript that calls an ad server. FIG. 1 does not depict an ad server, as it sits outside of the domain of the exemplary system illustrated. In the illustrated system, the FEUH 101 serves an ad tag to the user's browser, which then calls an ad server (not shown) for serving the ad to the user's browser, as will be known to those skilled in the art.

The FEUH 101 network may be comprised of multiple data centers (in the example shown in FIG. 1, located in Dallas, Tex., Seattle, Wash. and Washington, D.C., for purposes of illustration). Each network cluster is comprised of one or more load balancers 112 and one or more FEUH server farms 108, in the illustrated exemplary embodiment. Each FEUH server farm 108 has its own local HTTP balancer 107, multiple FEUH servers 106 and is associated with read-only Fast Retrieval (FR) store 109, again, in the illustrated exemplary embodiment. Other configurations will be known to those skilled in the art and are within the scope of the present invention.

Embedded in the FEUH application 106 is the business logic required to handle a specific set of parameters passed to it. By way of example, FEUH application 106 reads the page URL parameter; checks the domain or URL against a list of approved sites (i.e., the approved site list validates the source of the ad call and prevents running ads and processing on unapproved sites); passes the URL to classification engine 102; examines the site and zone parameters (i.e., the site parameter is the identification of the publisher/site that is recognized by the ad server and the zone parameter is a subsection of the site as defined by the publisher, which may be used for ad targeting and trafficking purposes); checks for any exceptions related to those sites or zones (for example, specific classifications used for any site or zone); checks the network identifier parameter (i.e., an alphanumeric code that uniquely identifies the ad network running the tag); performs any special processing for that network; and retrieves the context for the page URL.

Fast Retrieval (FR) Store 103 comprises a set of segments attached to a CloudID, Network, Mapping and Context and a set of contexts attached to a URL. The FEUH application 106 makes use of these pieces of data to craft the necessary ad call to an ad server. For example, the ad call would include a series of parameters, formatted as key/value pairs in a query string that would influence the ad server's decision on which ad to serve. Multiple key/value pairs may be used if the particular user matches multiple behavioral segments.

The CloudStore 111 adds the intelligence to the business logic in the FEUH application 106. The CloudStore 111 comprises a set of data stores and workers/processes that operate in concert to form the data for the FR store 103 so that the FEUH application 106 can make decisions and deliver the proper parameters to an ad server. For example, the business logic used in this respect determines what behavioral characteristics to apply to different segments, and determines matching characteristics for the current user (e.g., if user history indicates more than 15 impressions on sports pages in the last 5 days, that user may match the sports-fan segment name.)

Behavioral Tracking Store 105 is a Btree based disk database, in the exemplary embodiment, that utilizes an HTTP interface with memory-based caching. Every time a Cloud User is seen on the network, the visit is recorded to a given site based on the user's ID, Network, Mapping and Context. This results in a dataset that is multiple times larger than the size of the total unique users because of the segmentation of the data needed.

Fast retrieval store 103 is a key-value memory-based datastore that utilizes a network communication protocol. Fast retrieval store 103 comprises the end result of the other workers and stores used in connection with the system. It is the final data that is replicated out to all of the FEUH cluster nodes 101 to help in the delivery of ads. Such data would take the form, in an exemplary embodiment, as follows: COMPANYID_NETWORK_MAPPING=["SEGMENT1", "SEGMENT2"]. Thus, the key is a concatenation of (a) the unique user id, (b) the network company identifier, and (c) the contextual mapping identifier. SEGMENT1, SEGMENT 2 etc. are the names of the segments whose definitions match the user's behavior pattern. For example, 12345_cm_default=["cm.sports_L", "cm.polit_H"] signifies user 12345 for the default context mapping on network; and cm matches the cm network sports-light and politics-heavy segments. This data organization supports any number of external data providers.

The following describes the steps that are involved in one embodiment of the behavioral targeting process. A user interface is provided that allows a company to setup behavioral segments by creating a classification mapping and setting behavioral parameters around that classification mapping. These parameters include the probability percentage that a page is about a certain classification, the frequency with which that type of classification is visited, and the recency or time interval involved, as described above.

Once the parameters are established, behavioral characterization is used in connection with the process of classification of Internet pages. As advertisements are served to a user viewing Internet pages and classification of the pages visited is accomplished, a cookie is dropped to uniquely identify the user.

A corresponding record to the cookie is created in the storage mechanism (i.e., data cloud 111) and the classification for that page is registered in the behavioral tallying cache. A process regularly reviews the behavioral tallying cache using the parameters setup by the company to identify users that qualify for various behavioral segments.

The data cloud 111 is then updated with the behavioral segments and cache expirations are set as to maintain the validity of the behavioral segments. This is done to separate out users that are "in market" for various behaviors versus "out of market". For example, consider a user that is looking for a new mortgage. In general, people typically do not look for a mortgage for over 30 days. The cached expiration helps contain the problem of infinite growth for those people who clear their cookies.

As advertisements are served, they are processed by the FEUH 101 which performs a look up in the data cloud 111 to determine to what behavioral segments a user belongs. This is accomplished by checking the cookie of the user for his unique id. If the cookie does not exist, a new cookie is created with a new id.

The behavioral segments passed along to the ad server are passed by dynamically creating an ad call based on the ad server being targeted. The ad server then reads the ad call and identifies the various targeting parameters, including the behavioral segments, and serves an ad accordingly.

Figure 2:
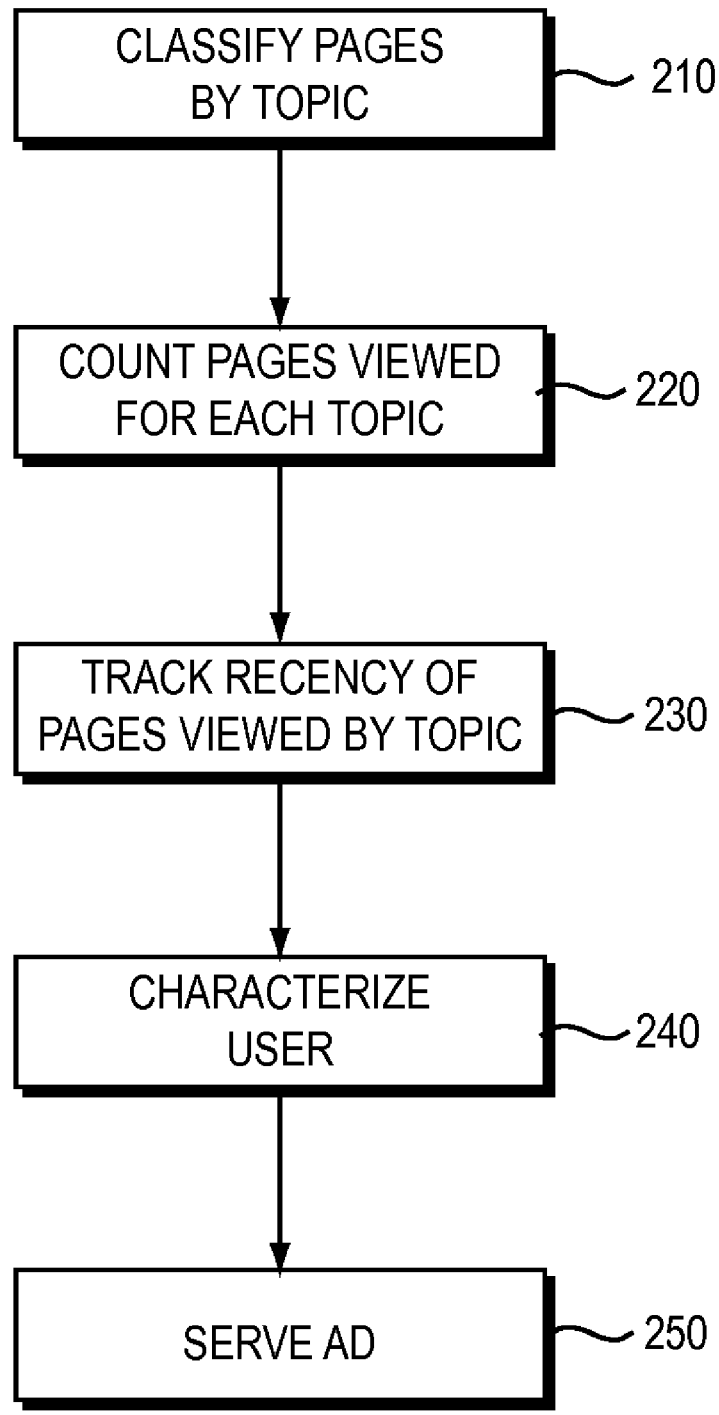
FIG. 2 a flow diagram illustrating an exemplary method of the present invention.

With reference to FIG. 2, a flow diagram of an exemplary method of the present invention is illustrated. In step 210, a plurality of pages viewed by a communications network user are classified as pertaining to one of a plurality of topics. In step 220 a count of each of the pages viewed by the communications network user for each of the topics is tracked, as is a recency with which each of the pages viewed by the communications network user was viewed for each of the topics, in step 230. The communications network user is characterized as belonging to one or more behavioral segments based on the number and the recency in step 240. Advertisements are served to the communications network user based on at least advertising targeting parameters and the characterization in step 250.

It will be apparent to those skilled in the art that various modifications and variations can be made in connection with the system and method of the present invention without departing form the spirit or scope of the invention. Thus, it is intended that the present invention cover the modifications and variations of this invention provided they come within the scope of the appended claims and their equivalents.

What is claimed is:

1. A system comprising:
    one or more data repositories configured to store data comprising information classifying each of a plurality of pages viewed by a communications network user device as pertaining to one of a plurality of topics, wherein the one or more data repositories are remote from the user device;
    one or more processors configured to receive information from the user device that enables the one or more processors to track a count of each of the pages viewed by the user device for each of the topics; to track a recency with which each of the pages viewed by the user device was viewed for each of the topics; and to characterize the user device as belonging to one or more behavioral segments based on the count and the recency;
    wherein one or more advertising servers, in communication with the one or more processors over the communications network, are configured to serve one or more advertisements to the user device based on at least advertising targeting parameters and the characterization; and
    wherein the one or more processors and the one or more data repositories are remote from the user device.

2. A computer-implemented method, wherein at least one processor is communicatively coupled to memory that stores at least one program and the at least one program, when executed by the at least one processor, causes the at least one processor to perform the method comprising:
    storing in one or more data repositories data comprising information classifying each of a plurality of pages viewed by a communications network user device as pertaining to one of a plurality of topics;
    receiving information from the user device that that enables tracking a count of each of the pages viewed by the user device for each of the topics; tracking a recency with which each of the pages viewed by the user device was viewed for each of the topics; and characterizing the user device as belonging to one or more behavioral segments based on the count and the recency;
    wherein one or more advertisements are served to the user device, by one or more advertising servers in communication with the at least one processor over the communications network, based on at least advertising targeting parameters and the characterization, and
    wherein the at least one processor and the one or more data repositories are remote from the user device.

3. A computer-readable storage medium having stored thereon instructions which, when executed by one or more processors, cause the one or more processors to perform a method comprising:
    storing in one or more data repositories data comprising information classifying each of a plurality of pages viewed by a communications network user device as pertaining to one of a plurality of topics;
    receiving information from the user device that enables tracking a count of each of the pages viewed by the user device for each of the topics; tracking a recency with which each of the pages viewed by the user device was viewed for each of the topics; and characterizing the user device as belonging to one or more behavioral segments based on the count and the recency;
    wherein one or more advertisements are served to the user device, by one or more advertising servers in communication with the at least one processor over the communications network, based on at least advertising targeting parameters and the characterization; and
    wherein the processor and the one or more data repositories are remote from the user device.

* * * * *